United States Patent [19]
Chen et al.

[11] Patent Number: 5,558,445
[45] Date of Patent: Sep. 24, 1996

[54] SELF-CONTAINED HYDRODYNAMIC BEARING UNIT AND SEALS

[75] Inventors: Shuo-Hao Chen, Fremont; Yan Zang, Milpitas; Michael R. Hatch, Mountain View, all of Calif.

[73] Assignee: Quantum Corporation, Milpitas, Calif.

[21] Appl. No.: 363,566

[22] Filed: Dec. 22, 1994

Related U.S. Application Data

[63] Continuation-in-part of Ser. No. 278,803, Jul. 22, 1994, abandoned.

[51] Int. Cl.$^6$ ............................ F16C 33/74; F16C 32/06
[52] U.S. Cl. ......................... 384/132; 384/107; 384/135
[58] Field of Search ........................... 384/100, 107, 384/108, 109, 111, 112, 119, 124, 130, 132, 135; 310/90; 277/80, 135

[56] References Cited

U.S. PATENT DOCUMENTS

| | | | |
|---|---|---|---|
| 3,325,231 | 6/1967 | Ono | 384/132 |
| 3,778,123 | 12/1973 | Hendler et al. | 384/132 |
| 4,254,961 | 3/1981 | Fersht et al. | 277/80 |
| 4,274,684 | 6/1981 | Richfield | 384/135 |
| 4,596,474 | 6/1986 | Van Roemburg | 384/114 |
| 4,726,693 | 2/1988 | Anderson et al. | 384/114 |
| 4,795,275 | 1/1989 | Titcomb et al. | 384/107 |
| 4,892,418 | 1/1990 | Asada et al. | 384/124 |
| 5,067,528 | 11/1991 | Titcomb et al. | 141/4 |
| 5,112,141 | 5/1992 | Asada et al. | 384/100 |
| 5,112,142 | 5/1992 | Titcomb et al. | 384/107 |
| 5,246,294 | 9/1993 | Pan | 384/119 |
| 5,427,456 | 6/1995 | Hensel | 384/112 |

*Primary Examiner*—Thomas R. Hannon
*Attorney, Agent, or Firm*—David B. Harrison

[57] ABSTRACT

A self-contained hydrodynamic bearing unit includes a shaft and a shaft housing defining an opening for receiving the shaft for relative rotation. The shaft and bearing define at least one radial hydrodynamic bearing and an annular thrust bearing, formed as a disk portion extending radially outward of a main cylindrical surface of the shaft which cooperates with an adjacent annular face of the shaft housing. A gap between an outer cylindrical wall of the thrust bearing disk portion and an adjacently facing cylindrical surface of the shaft housing provides a primary annular capillary seal segment. An annular bushing ring extends from the housing radially inwardly to enclose the thrust bearing disk, and cooperates with an adjacent outer face of the thrust bearing disk to provide a secondary containment capillary seal segment. Normally, lubricating liquid is in the bearing unit at the radial hydrodynamic bearing, at the hydrodynamic thrust bearing and in the primary annular capillary seal segment. However, if liquid overflows from, or extends beyond the primary seal segment as by thermal expansion, it is contained in the secondary seal segment and urged to return by centrifugal force to the primary seal segment. A tertiary containment seal may also be provided to prevent escape of liquid to the external ambient.

26 Claims, 3 Drawing Sheets

SELF-CONTAINED HYDRODYNAMIC BEARING UNIT AND SEALS

RELATED APPLICATION

This is a continuation-in-part of U.S. patent application Ser. No. 278,803 filed on Jul. 22, 1994, now abandoned.

FIELD OF THE INVENTION

The present invention relates to fluid bearings. More particularly, the present invention relates to a self-contained hydrodynamic bearing unit which includes a plurality of lubricating liquid seals for preventing escape of lubricating liquid.

BACKGROUND OF THE INVENTION

In hard disk drives used as mass storage devices within computing systems, one important limitation of increasing track density is non-repetitive runout of ball bearing assemblies within a disk spindle. The highly non-repetitive runout of a ball bearing system is thought to result from bearing geometry defects that cannot be attenuated by the very thin lubricant film between the rolling ball elements and the raceways of each ball bearing unit. A disk drive having a spindle with high runout results in a limitation upon the number of concentric data tracks that can be provided on the storage surfaces of the disk, because the tracks must be spaced sufficiently apart to accommodate the non-repeatable runout tolerances.

Hydrodynamic bearing systems provide one solution to this problem in that the spindle is running on a fully developed lubricant film that prevents contact between a shaft and a sleeve enveloping the shaft. Because of limited space available in contemporary small-form-factor disk drives, and because of a need to minimize prime costs, it is preferable to have a self-contained hydrodynamic bearing system with no external lubricant supply. For such bearing systems, preventing lubricant leakage has become a prime issue of concern.

Lubricant supply to hydrodynamic bearings is conventionally established by centrifugal force causing pumping of a lubricating liquid into a journal to form a substantially uniform bearing film between two relatively rotating members, such as a shaft and a sleeve or housing. It is also conventional to establish the pumping action of the bearing by defining relief grooves or a helical groove inclined at a specified angle relative to an axis or plane of rotation (as in the case of hydrodynamic thrust bearings) in one of the surfaces of the hydrodynamic bearing journal, the other surface being extremely smooth. Ideally, unidirectional relative rotation between the shaft and the sleeve causes the lubricating liquid to be pumped into the journal and maintained as a desired lubricant film layer therein under pressure.

Computer disk drives that use hydrodynamic bearings within disk spindle assemblies have commonly utilized one type of fluid bearing design, known in the art as a "herringbone" pattern bearing, or simply a "herringbone bearing". This label may be attributed to a repeating, generally symmetrical pattern of Vee-shaped relief grooves formed in either a shaft or in a bearing sleeve or housing. The ungrooved element has a smooth surface. Relative unidirectional rotation of the shaft and the sleeve causes the lubricating liquid to enter the legs of each Vee groove and flow toward an apex thereof, where fluid pressure from the resultant pumping action creates and maintains a hydrodynamic bearing during the relative unidirectional rotation between the shaft and its associated housing.

There have been a number of prior approaches for providing seals for hydrodynamic bearing units. Static seals, such as O-rings, and dynamic clearance seals, such as surface tension or capillary seals, have been employed to seal hydrodynamic bearings.

One prior example is found in Hendler et al. U.S. Pat. No. 3,778,123 entitled: "Liquid Bearing Unit and Seal". In the Hendler et al. approach, a non-wettable liquid, such as mercury, is placed in an annular Vee-groove at an outside boundary of the hydrodynamic bearing system. In addition, a thin film of low vapor pressure vacuum pump oil is provided at an annular gap or space at the end of a journal member in order to retain the mercury seal. A pair of thin barrier films are also provided at the outer edge of the annular space to prevent the oil from spreading as a result of surface effects and/or centrifugal forces generated by relative rotation of the bearing system.

Another prior approach is found in Van Roemburg U.S. Pat. No. 4,596,474, entitled: "Bearing System Comprising Two Facing Hydrodynamic Bearings". In the Van Roemburg approach, two radial fluid bearings were separated by a central reservoir. Each bearing included a herringbone pattern, and the herringbone patterns were such that the outer legs of the Vee-grooves forming the herringbone pattern were longer than the inner legs. However, the system maintained balanced pressure. This arrangement built up a lubricating liquid pressure at the apex of each Vee-groove which was greater than a counter pressure built up by the inner legs and by helical feed grooves which feed lubricant from a central reservoir area. By providing this differential pressure arrangement it is said that the lubricant was not pumped out of the bearing system.

A further prior approach is described in Anderson et al. U.S. Pat. No. 4,726,693, entitled: "Precision Hydrodynamic Bearing". The Anderson et al. approach uses a plurality of seals formed along the bearing unit including spiral grooves as well as an upper surface tension or capillary seal and a lower surface tension or capillary seal. However, the very nature of the Anderson et al. approach suggested that it was not adapted to omnidirectional operation or resistance to shock or vibratory forces.

Another prior approach is described in Titcomb et al. U.S. Pat. No. 4,795,275 and divisional U.S. Pat. Nos. 5,067,528 and 5,112,142, entitled: "Hydrodynamic Bearing". In the prior approaches described in these patents, surface tension dynamic seals were provided between axially extending surfaces of a thrust plate and bearing sleeve (or between tapered bearing surfaces). Pressure equalization ports were required and extended between the dynamic seals and interior lubricant reservoirs (or interior dynamic seals) to balance the hydrodynamic pressures in the lubricant in order to prevent the lubricant from being pumped through one of the dynamic seals. A method for introducing lubricating liquid into the hydrodynamic bearing employing a vacuum chamber and ultrasound is also described.

A similar prior approach is described in Pan U.S. Pat. No. 5,246,294 entitled: "Flow-Regulating Hydrodynamic Bearing". In this approach a disk spindle employs oppositely facing conical hydrodynamic bearing surfaces and a series of chambers and passages and a gravitational valve are provided to permit pressure-equalized centrifugally pumped global circulation of lubricating liquid drawn from one or more large reservoir volumes. A leak-preventing capillary trap "of minimum continuous axial length" may be provided at a clearance seal for passive capture of wandering lubricant when the bearing unit is at rest.

Small form factor disk drives are used in unlimited applications and orientations. Consequently, a hydrodynamic bearing system for a disk spindle in such drives must also operate in all possible orientations, and to be able to withstand and sustain certain shock events and vibration levels. A hitherto unsolved need has remained for a hydrodynamic bearing system which is leak free irrespective of orientation, shock and vibration.

SUMMARY OF THE INVENTION WITH OBJECTS

A general object of the present invention is to provide a self-contained hydrodynamic bearing system which minimizes the risk of lubricating liquid leakage under all required operating conditions for disk drive spindle applications in a manner overcoming limitations and drawbacks of the prior art.

Another object of the present invention is to provide a simplified hydrodynamic bearing system which includes primary, secondary and tertiary clearance-type seals for trapping and containing lubricating liquid and an arrangement for returning liquid trapped at the secondary seal to the primary seal.

A further object of the present invention is to provide a hydrodynamic bearing design for a disk drive spindle assembly which virtually eliminates lubricating liquid leakage thereby to improve substantially the useful life of the bearing and disk drive.

One more object of the present invention is to provide a hydrodynamic bearing assembly for a disk drive spindle and including both radial hydrodynamic bearings and axial thrust hydrodynamic bearings and a plurality of seals in an arrangement facilitating manufacture and assembly and leading to virtual leak-free operation, even when subjected to shock or vibration energy.

One further object of the present invention is to provide a vertical height-reduced, self-contained hydrodynamic bearing unit for a disk drive spindle which includes both radial hydrodynamic journal bearings, and axial hydrodynamic thrust bearings and which includes height reduced, folded over outer capillary/centrifugal seals, each seal having an inner axial segment contiguously communicating with an outward radial segment.

Still one more object of the present invention is to provide a simplified hydrodynamic bearing design which is simpler to manufacture, which operates reliably in any angular orientation, and which achieves superior bearing longevity over prior art fluid bearing designs.

In accordance with principles of the present invention, a self-contained hydrodynamic bearing unit includes a shaft and a shaft housing defining an opening for receiving the shaft for relative rotation. At least one radial hydrodynamic bearing is defined between the shaft and the shaft housing. In addition, the shaft defines an annular thrust bearing disk portion extending radially outward of a main cylindrical surface of the shaft which cooperates with an adjacent annular face of the shaft housing to define a hydrodynamic thrust bearing. A gap is formed between an outer cylindrical wall of the thrust bearing disk portion and an adjacently facing cylindrical surface of the shaft housing which preferably diverge away from the radial hydrodynamic bearing to provide a primary surface tension annular capillary seal.

An annular bushing ring extends from the housing radially inwardly to enclose the thrust bearing disk, and has an interior annular plateau region facing an adjacent outer face of the thrust bearing disk to define a secondary containment surface tension capillary seal. Normally, lubricating liquid is in the bearing unit at the radial hydrodynamic bearing, at the hydrodynamic thrust bearing, at all lubricant reservoirs and in the primary annular capillary seal.

The secondary containment capillary seal is provided for trapping lubricating liquid otherwise escaping from the primary annular capillary seal and for returning it to the primary annular capillary seal by centrifugal force generated by the relative rotation between the shaft and the shaft housing. Also, the secondary containment capillary seal may be coated with a thin film barrier material for impeding surface flow of the lubricating liquid droplets. Alternatively, the secondary containment capillary seal may comprise a folded-over extension of the primary annular capillary seal, increasing storage capacity for the hydrodynamic liquid, and/or enabling realization of a height-reduced bearing unit using a thinner thrust bearing plate or disk portion.

A tertiary containment capillary seal may also be provided for further trapping and containment of lubricating liquid droplets otherwise escaping from the secondary containment capillary seal, the tertiary containment capillary seal being formed by a narrow cylindrical gap defined between the shaft and an inner face of the annular bushing ring. Preferably, the tertiary containment capillary seal is coated with a thin film barrier material for impeding surface flow of the lubricating liquid droplets.

A disk drive spindle assembly preferably includes two of these new radial-thrust bearings and containment units, one as described, and another on a common shaft formed as a mirror image of the one.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 1:
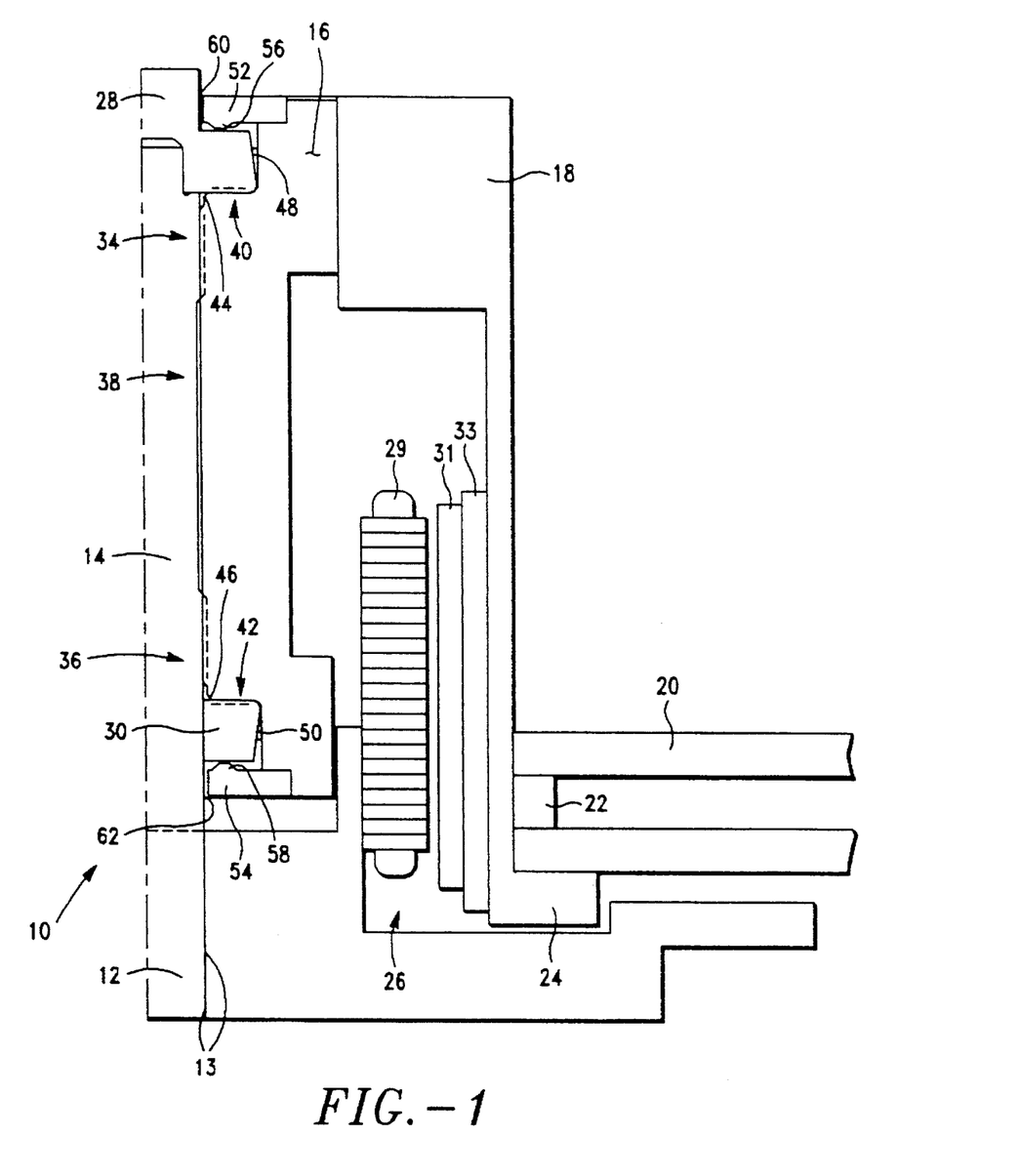
FIG. 1 is an enlarged diagrammatic view in sectional view and elevation of a right one half side of a self-contained hydrodynamic bearing unit within a hard disk drive spindle in accordance with principles of the present invention.

A spindle assembly 10 for a high performance miniature hard disk drive is illustrated in FIG. 1. The spindle assembly 10 includes a base 12 and a shaft 14 which in this example is fixed securely to the base 12 e.g. by being press-fit and/or bonded into a suitably sized opening 13 defined in the base 12. A shaft housing 16 fits closely over the shaft 14 and cooperatively defines two hydrodynamic radial bearings 34 and 36.

A spindle hub 18 is attached to the shaft housing 16 and supports one or more data storage disks 20. The disks 20 are spaced apart by suitable annular spacers, and the lowest disk rests upon a radial flange 24 of the hub 18. An in-hub spindle motor 26 is provided to rotate the hub 18 and disks 20 relative to the base 12 and shaft 14 at a predetermined angular velocity. The motor 26 includes a stator assembly 29 fixed to the base, and an annular permanent magnet 31 and ferromagnetic flux return plate 33 which are fixed to an inside wall of the hub 18. These elements, while needed to rotate the hub 18 and disks 20, are not a part of the present invention, and they may take a variety of forms in practice.

An upper annular thrust bearing plate 28 fits securely over the shaft 14, while a lower annular thrust bearing ring 30 also fits securely over the shaft 14. Together, the plate 28 and ring 30 cooperate with adjacently facing radial faces of the shaft housing 16 to provide two hydrodynamic thrust bearings 40 and 42. A central axial reservoir region 38 is provided for lubricating liquid between the two radial hydrodynamic bearings 34 and 36. Two end reservoirs 44 and 46 are formed respectively between the bearings 34 and 40, and the bearings 36 and 42. These end reservoirs also contain and supply lubricating liquid to the bearings.

Since the shaft 14 and sleeve 16 include both radial hydrodynamic bearings 34 and 36, and axial thrust bearings 40 and 42, it is important that these elements are selected of materials having complementary coefficients of thermal expansion, as the motor 26, as well as rotational friction, will generate heat and cause the shaft 14 and shaft sleeve 16 to expand. The shaft 14 may be formed of stainless steel or carbon steel, and in this case a bronze alloy is preferred for the sleeve 16. Alternatively, the shaft 14 and sleeve 16 may be formed of carbon steel, and one or both hardened to a suitable hardness. The ambient temperature clearances for the radial hydrodynamic bearing surfaces between the shaft 14 and sleeve 16 are about 3–7 μm, while the ambient temperature clearances between oppositely facing surfaces of the hydrodynamic thrust bearings 40 and 42 is about 10 μm. The bearing surfaces are most preferably finished to an ANSI surface finish of approximately 8 micro inch root-mean-square, or better.

Two primary containment, surface tension annular capillary seals 48 and 50 are provided in annular gaps outwardly beyond the two thrust bearings 40 and 42 relative to the shaft 14. The primary seal 48 is formed by outwardly axially divergent, oppositely facing cylindrical walls of the thrust plate 28 and shaft housing 16, and the primary seal 50 is formed by outwardly axially divergent, oppositely facing cylindrical walls of the thrust ring 30 and the shaft housing 16. In these seals 48 and 50, a curved lubricant-air interface typical of a surface tension interface is located approximately midway of the gap.

Two oil containment bushings 52 and 54 are secured e.g. by press fitting or bonding in a sealed arrangement to the shaft housing 16 as shown in FIG. 16. Each bushing 52, 54 may define a raised annular plateau region 56, 58 which is formed adjacent to an inner annular opening thereof. The plateau region 56 faces an outer radial wall of the upper annular thrust bearing plate 28, while the plateau region 58 faces an outer radial wall of the lower annular thrust ring 30. Alternatively, the plateau regions 56 and 58 may be formed as features of the thrust bearing plate 28 and the lower annular thrust ring 30 and face the bushings 52 and 54. Also, multiple plateaus and secondary containment capillary seals may be defined between the bushings 52 and 54, and the respective faces of the upper annular thrust bearing plate 28 and the lower annular thrust ring 30.

The plateau regions 56 and 58 are closely spaced apart from, and thereby define in conjunction with the respectively facing radial walls, two secondary oil containment surface tension capillary seals. These containment seals will capture and trap any lubricating liquid drops that may escape from one of the primary capillary seals 48 or 50 due to shock forces, vibration, or any other causes. During spindle operation, centrifugal force generated by relative rotation of the spindle housing 16 and shaft 14 will sling back the trapped lubricating liquid to the wall of the shaft housing forming the adjacent primary capillary seal 48 or 50, and the liquid will be returned thereto without escaping from the spindle assembly.

Two cylindrical axial spaces 60 and 62 provide for tertiary containment of lubricating liquid, in the event that the liquid migrates beyond the secondary containment seals formed by the plateaus 56 and 58. The secondary and tertiary capillary seals are explained in greater detail below in conjunction with the discussion of FIG. 2.

The spindle 10 is preferably assembled by press-fitting the thrust ring 30 over the shaft 14. The shaft sleeve 16 is then fitted over the shaft 14, and the upper thrust bearing plate 28 is then press fit over the end of the shaft 14. The partially assembled bearing is then loaded with hydrodynamic fluid so that the reservoirs 38, 44, and 46, and the two primary capillary seals 48 and 50 are filled. Then, the upper oil containment bushing 52 and lower oil containment bushing 54 are secured to the shaft sleeve 16. The completed bearing assembly is attached to the base 12, as by press fitting the lower end of the shaft 12 into the opening 13 and/or gluing the shaft to the base with a suitable adhesive material. The spindle motor stator assembly 29 is then installed, and the hub 18, with the annular magnet 31 and flux return ring 33 in place, is then installed onto the shaft sleeve 16. The disks 20 and spacers 22 are then installed, and a disk clamp (not shown) is installed to lock the disks 20 in place.

The radial hydrodynamic bearings 34 and 36, and the hydrodynamic thrust bearings 40 and 42 may be established in conventional fashion by defining herringbone or spiral groove patterns into one or both of the adjacently opposite faces of the shaft 14 and shaft housing 16 at the bearing surfaces. One particularly preferred pattern which provides localized net flow of lubricating liquid with zero global flow thereof is described in commonly assigned, copending U.S. patent application Ser. No. 08/278,805, filed on Jul. 22, 1994, U.S. Pat. No. 5,407,281 and entitled: "A Self-Replenishing Hydrodynamic Bearing", the disclosure thereof being incorporated herein by reference.

Figure 2:
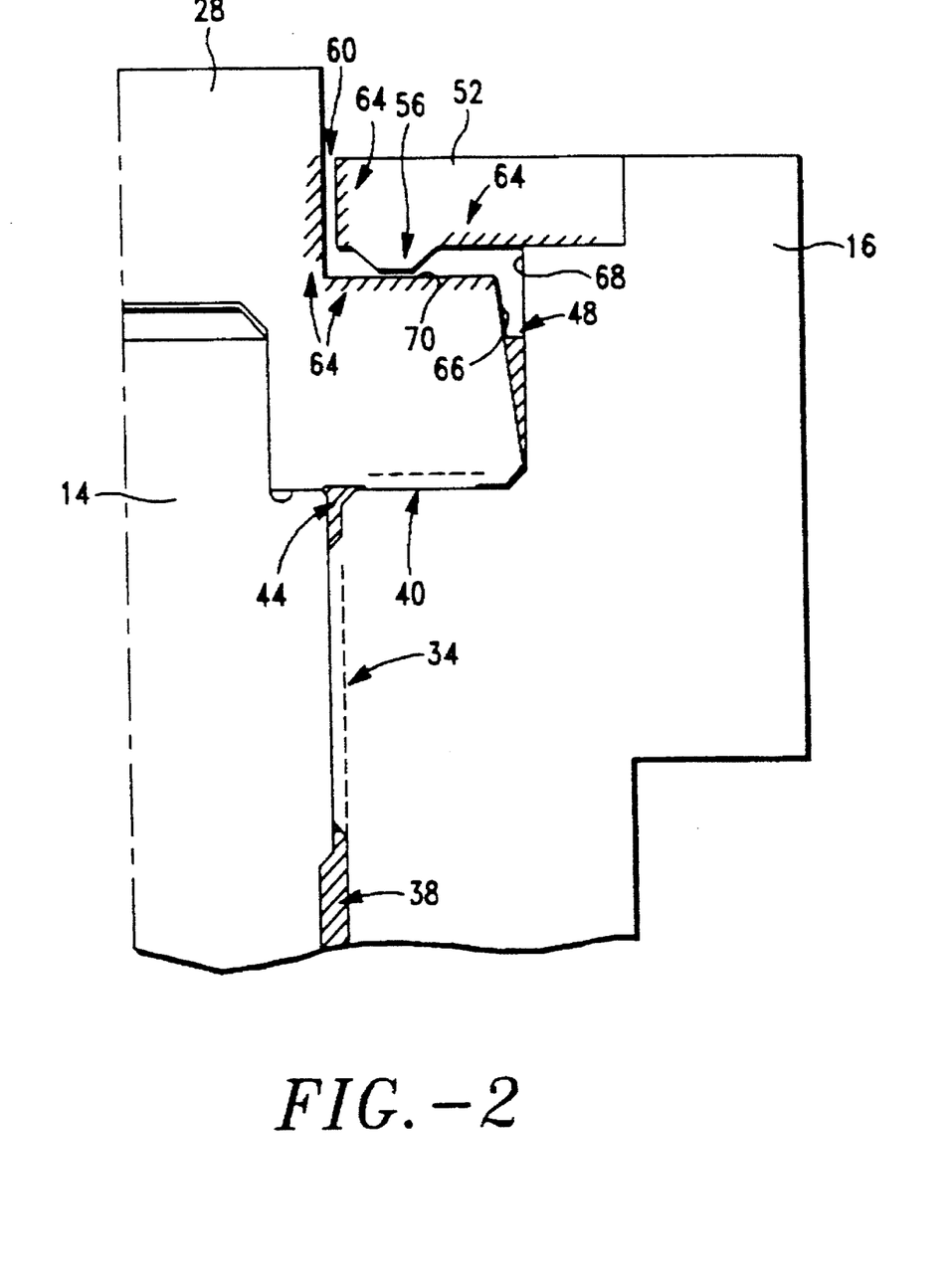
FIG. 2 is an enlarged view of a region of the FIG. 1 drawing enclosed within a circle therein.

As shown in the enlarged partial view of FIG. 2, certain surfaces of the bearing assembly are treated with a thin film barrier material which exhibits low surface energy and inhibits surface spread or migration of lubricating liquid material. These surfaces include oppositely facing cylindrical surfaces of the narrow gap 60 (and gap 62) forming the tertiary containment seal, and the surfaces of the secondary containment seals, except the annular plateaus 56 (and 58) One suitable material is available under the Nyebar brand. The areas treated with the thin film barrier material are shown hatched in FIG. 2 and carry a reference number 64. As shown in FIG. 2, the primary containment capillary seal 48 (and lower seal 50) is formed within a cylindrical divergent gap formed by an outer cylindrical wall 66 of the upper thrust bearing plate 28 and an adjacently facing inner cylindrical wall 68 of the shaft sleeve 16. The lubricating liquid is most preferably a low evaporation rate, low breakdown lubricating oil which does not wet or dissolve the thin film barrier material.

An outer face 70 of the thrust plate 28 (or an oppositely facing surface of the shaft sleeve 16) may include spiral grooving to generate further inward pumping force for adding to the centrifugal force resulting from rotation of the housing 16 relative to the shaft 14 and plate 28. The combination of the primary capillary seals 48 and 50, the secondary containment capillary seals at the annular plateaus 56 and 58, and the tertiary seals at the axial gaps 60 and 62 provide a positive lubricating liquid containment system which provides virtual leak free sealing of the hydrodynamic bearing assembly.

Figure 3:
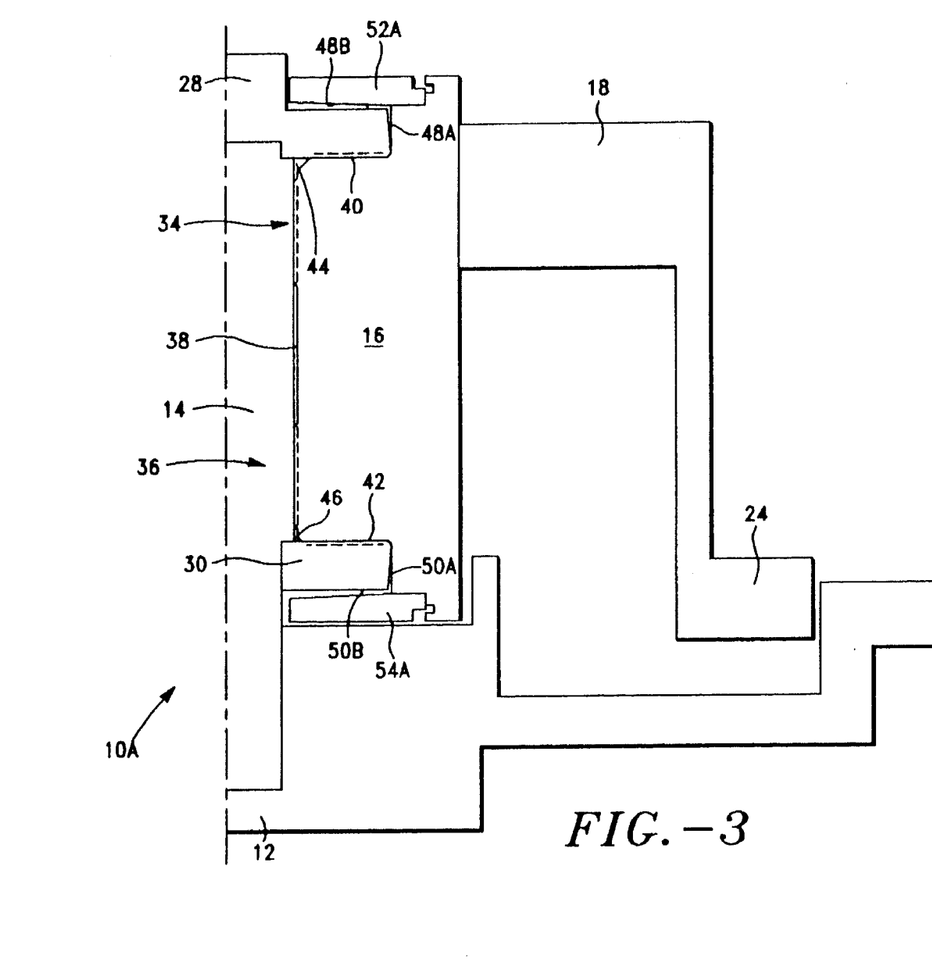
FIG. 3 is an enlarged diagrammatic view in section and elevation of a right one half side of an alternative self contained hydrodynamic bearing unit and seals within a disk drive spindle also in accordance with principles of the present invention.

FIG. 3 illustrates an alternative preferred embodiment of a hard disk spindle assembly 10A including a self-contained hydrodynamic bearing unit having further features of the present invention. Elements of the assembly 10A which are substantially unchanged from the spindle assembly 10 of FIGS. 1 and 2 are given the same respective reference numerals. Also, in FIG. 3 elements comprising the DC brushless spindle motor illustrated in FIG. 1 are omitted to simplify the drawing. In practice spindle motor elements, such as the ones illustrated in FIG. 1, would be included within the disk spindle assembly 10A.

Figure 4:
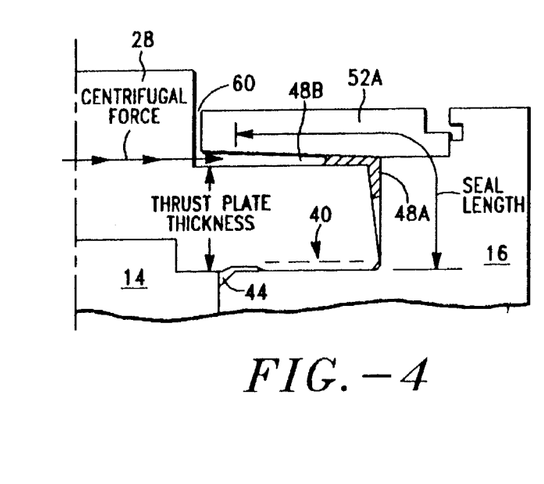
FIG. 4 is a substantially enlarged portion of an upper thrust bearing and folded capillary/centrifugal seal of the FIG. 3 embodiment.

In the FIG. 3 embodiment modified oil containment bushings 52A and 54A are provided which essentially extend the effective length and volume of the capillary seals 48 and 50. In FIG. 4, the seal 48 is shown as having an inner axially extending segment 48A, and an outer radially extending segment 48B which communicates with, and extends, the axial segment 48A. While the axial segment 48A includes axially divergent walls, the divergence is continued in the radial dimension with the walls forming the outer radial segment 48B. Preferably, a relatively small divergence angle of 2 to 4 degrees is preferred, beginning at the annular edge of the thrust bearing 40. A small divergence (taper) angle limits the volume of the capillary seal A substantially identical arrangement is provided for the lower capillary seal 50, with an inner annular segment 50A and an outer radial segment 50B contiguous with the inner segment.

As shown in FIG. 4, by extending the seal length over the distance illustrated by the right-angled double headed arrow labelled "seal length", a greater quantity of hydrodynamic lubricant may be contained within the bearing unit. Also, the bearing unit may be filled such that the lubricant substantially occupies the inner axial segments 48A and 50A at an ambient temperature present during non-operation of the spindle assembly 10A. During elevated temperature conditions occuring during operation of the spindle assembly, the outer radial segments 48B and 50B enable the hydrodynamic lubricant to expand from the inner segments 48A and 48B without loss, since centrifugal force, denoted by the arrow in FIG. 4, urges the hydrodynamic lubricant away from the outer opening 60, and toward the inner axial segment 48A.

There are a number of advantages with the spindle assembly 10A illustrated in FIGS. 3 and 4. First, the combined length of the inner and outer segments 48A and 48B is much longer than the length of an axial taper seal alone, providing a lubricant holding capacity under thermal expansion and contraction conditions and to acommodate manufacturing tolerances.

Second, the length of the vertical or axial span of the segment 48A may be made shorter than with an axial taper seal alone. This smaller axial length enables each thrust plate 28 and 30 to be made correspondingly smaller in the axial dimension, with a desired consequence of reducing overall axial length (height dimension) of the spindle assembly 10A. This height-reduction feature is especially desired in small 3.5 inch and 2.5 inch form factor hard disk drives having reduced height dimensions as one inch or less. Also, by shortening the axial length of the segments 48A and 50A, the vertical span of the two journal bearings 34 and 36 may be increased which results in increased conical stiffness of the bearing unit and spindle assembly 10A.

Third, as already mentioned, centrifugal force applies from the axis of rotation radially outwardly toward the axial segments 48A and 50A. Since the lubricant surface sits close to the outside diameter of the bearing unit and the outer end 60 of the seal 48 is near the inside diameter of the bearing unit, movement of lubricant toward the outside of the bearing unit is impeded by the centrifugal force. Thus the outer folded-over segments 48B and 50B contain the lubricant by capillary force and by centrifugal force. The centrifugal force will also drive any splashed droplets of lubricant back into the bulk volume of lubricant within the axial segment 48A, for example.

Fourth, by using the radial segment 48B as part of the overall capillary seal structure, it becomes easier to control filling the seal 48 to a desired volume of hydrodynamic liquid. One suitable filling procedure includes the steps of filling the entire bearing unit until a capillary seal surface is present at the outer part of the axial segments 48A and 50A. The outside surfaces of the thrust bearings 28 and 30 are then cleaned, and the thrust bushings 52A and 54A can then be installed. After this step, the bearing unit can be attached to the base 12 as by press-fitting the shaft 14 into a suitable opening defined in the base 12.

As the bearing unit runs at a higher temperature than during filling, lubricant volume expands, and the lubricant enters the radial segments 48B and 50B. As a result, the nominal oil/ambient air interface resides in the radial seal segments 48B and 50B, but closer to the outside diameter of the bearing than the inside annular passage 60 leading to ambient. The surfaces of the passage 60 may be coated with a suitable thin film barrier material, as discussed above in connection with the embodiment of FIGS. 1 and 2.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

·What is claimed is:

1. A self-contained hydrodynamic bearing unit comprising a shaft and a shaft housing defining an opening for receiving the shaft for relative rotation, at least one radial hydrodynamic bearing defined between the shaft and the shaft housing, the shaft defining an annular thrust bearing disk portion extending radially outward of a main cylindrical surface of the shaft and cooperating with an adjacent annular face of the shaft housing to define a hydrodynamic thrust bearing, a gap being formed between an outer cylindrical wall of the thrust bearing disk portion and an adjacently facing cylindrical surface of the shaft housing for defining a primary annular surface tension capillary seal, and an annular bushing ring extending from the housing radially inwardly to enclose the thrust bearing disk, at least one of the annular bushing ring and an adjacent outer face of the thrust bearing disk forming a secondary containment capillary seal, there normally being lubricating liquid in the bearing unit at the radial hydrodynamic bearing, at the hydrodynamic thrust bearing and in the primary annular capillary seal, the secondary containment capillary seal for containing overflow of lubricating liquid from the primary annular capillary seal, the trapped lubricating liquid being urged toward the primary annular capillary seal by centrifugal force generated by the relative rotation between the shaft and the shaft housing.

2. The self-contained hydrodynamic bearing unit set forth in claim 1 wherein one of the annular bushing ring and the adjacent outer face of the thrust bearing disk define an interior annular plateau region for trapping lubricating liquid otherwise escaping from the primary annular capillary seal.

3. The self-contained hydrodynamic bearing unit set forth in claim 2 wherein the secondary containment capillary seal is coated with a thin film barrier material for impeding surface flow of the lubricating liquid droplets.

4. The self-contained hydrodynamic bearing unit set forth in claim 1 wherein the outer cylindrical wall of the thrust bearing portion and the adjacently facing cylindrical surface define a divergent gap for the primary annular capillary seal.

5. The self-contained hydrodynamic bearing unit set forth in claim 1 further comprising a tertiary containment capillary seal for trapping lubricating liquid droplets otherwise escaping from the secondary containment capillary seal, the tertiary containment capillary seal being formed by a narrow cylindrical gap defined between the shaft and an inner face of the annular bushing ring.

6. The self-contained hydrodynamic bearing unit set forth in claim 5 wherein the tertiary containment capillary seal is coated with a thin film barrier material for impeding surface flow of the lubricating liquid droplets.

7. A self-contained hydrodynamic bearing unit comprising a shaft and a shaft housing defining an opening for receiving the shaft for relative rotation, a plurality of spaced apart radial hydrodynamic bearings defined between the shaft and the shaft housing and separated by a central reservoir region containing a lubricating liquid, a pair of end reservoirs containing the lubricating liquid and located axially outside of the plurality of radial bearings, a pair of annular hydrodynamic thrust bearing ring portions of the shaft extending toward the shaft housing outwardly adjacent the pair of end reservoirs, a pair of primary annular surface tension capillary seals formed at annular gaps defined by oppositely facing cylindrical faces of the thrust bearing ring portions and the shaft housing, and a pair of annular static bushings secured to the shaft housing and aligned with and overlying the thrust bearing ring portions, one of each static bushing and an outer face of an adjacent thrust bearing ring portion defining an annular plateau forming a narrowed gap secondary containment capillary seal for trapping lubricating liquid droplets otherwise escaping from an adjacent primary capillary seal due to shock forces or vibration, the lubricating liquid being trapped at the secondary containment capillary seal being drawn back into to the adjacent primary annular capillary seal by centrifugal force during relative rotation between the shaft and shaft housing.

8. The self-contained hydrodynamic bearing unit set forth in claim 7 wherein each pair of annular static bushings define an annular plateau which faces the oppositely facing outer face of an adjacent thrust bearing ring portion thereby to form each said narrowed gap secondary containment seal.

9. The self-contained hydrodynamic bearing unit set forth in claim 7 wherein the annular gaps defined by oppositely facing cylindrical faces of the thrust bearing ring portions and the shaft housing are outwardly divergent.

10. The self-contained hydrodynamic bearing unit set forth in claim 7 further comprising a pair of tertiary containment capillary seals defined by narrow, axially extending cylindrical spaces adjacent inside walls of the annular static bushings.

11. The self-contained hydrodynamic bearing unit set forth in claim 10 wherein the tertiary containment capillary seals are coated with a thin film barrier material for impeding surface flow of the lubricating liquid droplets.

12. The self-contained hydrodynamic bearing unit set forth in claim 7 wherein the secondary containment capillary seals are coated with a thin film barrier material for impeding surface flow of the lubricating liquid droplets.

13. A self-contained fluid bearing disk spindle assembly for a hard disk drive comprising:

a base, a shaft secured to the base, a shaft sleeve defining an opening for receiving the shaft for relative rotation, a disk hub secured to the shaft sleeve, at least one data storage disk secured to the disk hub, DC brushless spindle motor means having a fixed stator assembly secured to the base and an annular permanent magnet assembly secured to an inner cylindrical face of the disk hub, for rotating the disk hub relative to the base at a predetermined unidirectional angular velocity, the shaft and the shaft sleeve cooperatively defining a pair of radial hydrodynamic bearings spaced apart along the shaft, a central reservoir for lubricating liquid between the pair of radial hydrodynamic bearings and a pair of end reservoirs axially outside of the pair of radial hydrodynamic bearings, a lower thrust bearing ring secured to the shaft axially beyond a lower one of the end reservoirs and facing a lower radial wall of the shaft sleeve for defining a lower fluid thrust bearing communicating with a lower one of the end reservoirs, an upper thrust bearing plate secured to the shaft axially beyond an upper one of the end reservoirs and facing an upper radial wall of the shaft sleeve for defining an upper fluid thrust bearing communicating with an upper one of the end reservoirs, an upper annular primary surface tension capillary seal formed in an annular gap defined by oppositely facing cylindrical faces of the upper thrust bearing plate and the shaft sleeve, a lower annular primary surface tension capillary seal formed in an annular gap defined by oppositely facing cylindrical faces of the lower thrust bearing ring and the shaft sleeve, an upper containment bushing secured to the shaft sleeve and having an inside wall cooperating with a facing outer wall of the upper thrust bearing plate to define an upper secondary containment capillary seal, a lower containment bushing secured to the shaft sleeve and having an inside wall cooperating with a facing outer wall of the lower thrust bearing ring to define a lower secondary containment capillary seal, and lubricating liquid in the central reservoir, end reservoirs and primary capillary seals, and forming lubricating films at the pair of radial hydrodynamic bearings and at the upper and lower thrust bearings, the upper secondary containment capillary seal, and the lower secondary containment capillary seal for for holding lubricating liquid flowing from one of the primary capillary seals and for urging the lubricating liquid to flow toward an adjacent one of the primary capillary seals in response to centrifugal force generated during relative rotation of the fluid bearing disk spindle assembly.

14. The self-contained fluid bearing disk spindle assembly set forth in claim 13 wherein the upper containment bushing and the lower containment bushing cooperate with respective adjacent facing outer walls of the upper and lower thrust bearings to define narrowed annular gap regions including plateaus enabling the upper and lower secondary containment capillary seals to trap and capture droplets of lubricating liquid otherwise escaping from an adjacent one of the primary capillary seals.

15. The self-contained fluid bearing disk spindle assembly set forth in claim 14 wherein the facing walls forming the annular gaps of the upper and lower annular primary capillary seals are outwardly axially divergent.

16. The self-contained fluid bearing disk spindle assembly set forth in claim 13 further comprising an upper tertiary containment capillary seal formed in a cylindrical gap between the upper thrust bearing plate and the upper bushing, and a lower tertiary containment capillary seal formed in a cylindrical gap between the shaft and the lower bushing, for trapping and containing lubricating liquid droplets escaping from an adjacent one of the secondary containment capillary seals.

17. The self-contained fluid bearing disk spindle assembly set forth in claim 16 wherein adjacent gap faces forming the upper and lower tertiary containment capillary seals are coated with a thin film barrier material.

18. The self-contained fluid bearing disk spindle assembly set forth in claim 13 wherein adjacent faces of the cylindrical gap between the upper thrust bearing plate and the upper bearing are coated with a thin film barrier material.

19. A self-contained hydrodynamic bearing unit having a first surface tension capillary seal, the bearing unit comprising:

a shaft and a sleeve defining an opening for receiving the shaft and being dimensioned relative to the shaft to enable relative rotation about an axis, a first hydrodynamic journal bearing defined between a main cylindrical surface of the shaft and the sleeve, the shaft including a first annular thrust bearing disk portion extending radially outwardly from the main cylindrical surface and cooperating with an adjacent annular face of the sleeve to define a first hydrodynamic thrust bearing, a first gap defined between an outer wall of the first thrust bearing disk portion and an adjacently facing surface of the sleeve comprising an axial segment of the capillary seal, a first annular bushing ring extending from the sleeve radially inwardly toward the shaft to enclose the first annular thrust bearing disk portion and defining in combination with the shaft a radially inward axial opening to ambient, a second gap defined between the bushing ring and an adjacent face of the thrust bearing disk portion comprising a radial segment of the first surface tension capillary seal, the axial segment of the first surface tension capillary seal being contiguous with the radial segment of the capillary seal, hydrodynamic lubricating liquid in the bearing unit at the first hydrodynamic journal bearing, at the first hydrodynamic thrust bearing and in at least the axial segment of the first surface tension capillary seal, the radial segment for receiving and holding lubricating liquid otherwise flowing out of the axial segment of the seal capillary seal, the lubricating liquid in the radial segment being forced toward the axial segment of the capillary seal by centrifugal force resulting from relative rotation between the shaft and the sleeve.

20. The self-contained hydrodynamic bearing unit set forth in claim 19 wherein the outer wall of the first thrust bearing disk portion and the adjacently facing surface of the sleeve define a divergent wall gap which diverges in an axial direction away from a region of the first hydrodynamic thrust bearing.

21. The self-contained hydrodynamic bearing unit set forth in claim 20 wherein an inside radial wall of the first annular bushing ring and the adjacent face of the first thrust bearing disk portion diverge toward the axis of rotation.

22. The self-contained hydrodynamic bearing unit set forth in claim 19 wherein adjacently facing walls of the shaft and the first annular bushing ring defining the axial opening to ambient are coated with a thin film barrier material.

23. The self-contained hydrodynamic bearing unit set forth in claim 19 further comprising:

a second hydrodynamic journal bearing defined between the main cylindrical surface of the shaft and the sleeve and axially spaced away from the first hydrodynamic journal bearing, the shaft including a second annular thrust bearing disk portion extending radially outwardly from the main cylindrical surface and cooperating with an adjacent annular face of the sleeve to define a second hydrodynamic thrust bearing, the first and second hydrodynamic journal bearings being located inwardly of the first and second annular thrust bearing disk portions, a central hydrodynamic lubricant reservoir defined in a gap between the shaft and sleeve between the first and second hydrodynamic journal bearings, a second gap defined between an outer wall of the second thrust bearing disk portion and an adjacently facing surface of the sleeve comprising an axial segment of a second surface tension capillary seal, a second annular bushing ring extending from the sleeve radially inwardly toward the shaft to enclose the second annular thrust bearing disk portion and defining in combination with the shaft a second radially inward axial opening to ambient, a second gap defined between the second bushing ring and an adjacent face of the second thrust bearing disk portion comprising a radial segment of the second surface tension capillary seal, the axial segment of the second surface tension capillary seal being contiguous with the radial segment of the second capillary seal, hydrodynamic lubricating liquid also present in the bearing unit at the central hydrodynamic lubricant reservoir, at the second hydrodynamic journal bearing, at the second hydrodynamic thrust bearing and in at least the axial segment of the second surface tension capillary seal, the radial segment for receiving and holding lubricating liquid otherwise flowing out of the axial segment of the second capillary seal, the lubricating liquid in the radial segment of the second capillary seal also being forced toward the axial segment of the second capillary seal by centrifugal force resulting from relative rotation between the shaft and the sleeve.

24. The self-contained hydrodynamic bearing unit set forth in claim 23 wherein the outer wall of the second thrust bearing disk portion and the adjacently facing surface of the sleeve define a divergent wall gap which diverges in an axial direction away from a region of the second hydrodynamic thrust bearing.

25. The self-contained hydrodynamic bearing unit set forth in claim 24 wherein an inside radial wall of the second annular bushing ring and the adjacent face of the second thrust bearing disk portion diverge toward the axis of rotation.

26. The self-contained hydrodynamic bearing unit set forth in claim 23 adjacently facing walls of the shaft and the second annular bushing ring defining the axial opening to ambient are coated with a thin film barrier material.

* * * * *